Sept. 4, 1945.  H. G. ALLEN  2,384,228
AUTOMATIC SCALE
Filed Nov. 4, 1943  3 Sheets-Sheet 1

INVENTOR
Howard G. Allen.
BY
James D. Bock
ATTORNEY

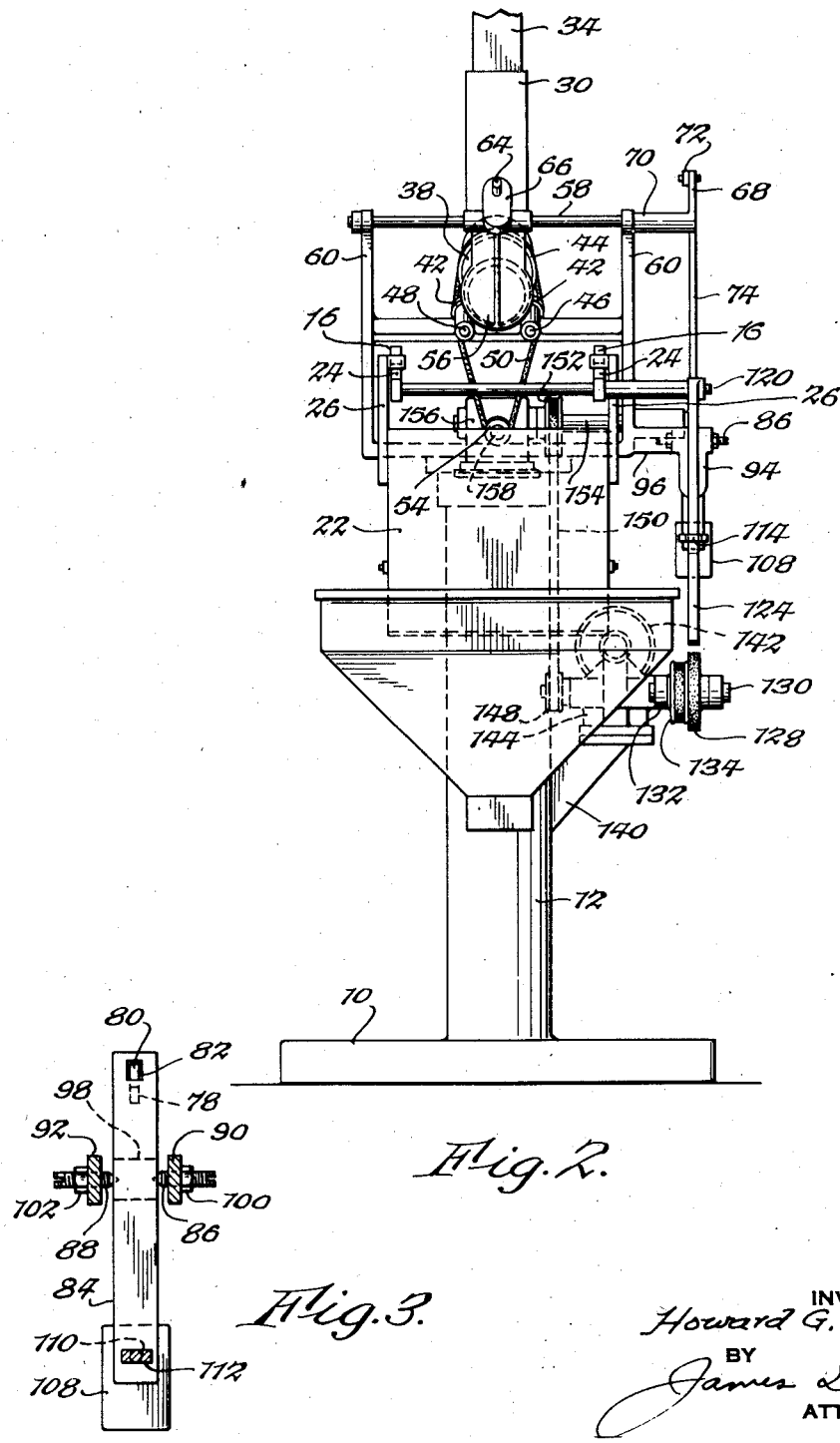

Sept. 4, 1945.  H. G. ALLEN  2,384,228
AUTOMATIC SCALE
Filed Nov. 4, 1943   3 Sheets-Sheet 3

INVENTOR
Howard G. Allen
BY
James D. Bock
ATTORNEY

Patented Sept. 4, 1945

2,384,228

UNITED STATES PATENT OFFICE 2,384,228

AUTOMATIC SCALE

Howard G. Allen, Niagara Falls, N. Y., assignor to Consolidated Packaging Machinery Corporation, Buffalo, N. Y., a corporation of New York Application November 4, 1943, Serial No. 508,932

4 Claims. (Cl. 249—42)

The present invention relates to automatic scales and, in particular, relates to that type of automatic scale in which a supply stream is cut off when a predetermined charge of material has been accumulated in a scale bucket.

In automatic scales of this general type, a scale bucket is carried at one end of the scale beam and suitable counterweights are adjustably located on the other end of the scale beam. A stream of material to be weighed is directed into the bucket and when the weight of the material accumulated therein is sufficient to overcome the counterweight, the scale beam will rock about its pivot and the bucket will drop. In order that the charge of material finally positioned within the bucket will be of precise weight, it is essential that the stream of material feeding to the bucket shall be cut off in an exactly uniform period of time after reaction of the scale beam. Obviously, the scale beam is so balanced that reaction occurs before the full charge has been positioned within the bucket. Thus the time consumed in dropping of the bucket and operation of the linkage for closing the gate is availed of to complete the charge. The last portion of the charge is actually in the air at the time it is weighed and it is essential that the amount of material in the air and the time between reaction and cut-off of the stream be accurately controlled.

In United States Patent No. 2,343,528, granted March 7, 1944, to Howland F. Briggs and owned by my assignee, the application for which was copending herewith, there is disclosed mechanism particularly adapted for delivering an exceedingly accurate and uniform stream of material to an automatic scale. When a stream of this uniformity is employed, the amount of material in the air at the time of cut-off will be substantially uniform on each operation of the scale. It is thus only necessary to insure that cutting off of this accurate stream will occur in precisely uniform periods of time upon operation of the scale. The present invention is particularly directed to this latter requirement.

The balance arms of automatic scales are usually arranged for a substantial swing upon each reaction and one purpose in so designing the arm has been to procure a movement of sufficient extent to operate latches or linkage of one type or another essential to cutting off of the stream and possibly essential to opening of the dumping gates in the scale bucket. While this practice has led to reasonable accuracy in the cutting off of the stream of material, it is an object of the present invention to provide gate actuating mechanism of considerably greater accuracy. To this end, the present invention contemplates the provision of a power-actuated means with which operating elements of the gate-closing mechanism are brought into engagement upon reaction of the scale beam. Thus the actual operation of the gate closing apparatus is effected by power means entirely independent of the motion of the scale bucket and sufficient power may thus be applied to insure rapid, firm and accurate closure of the gate and corresponding increase in accuracy of the scale. The amount of scale beam movement may be reduced and consequently the speed of operation may be increased.

It is an object of the present invention to provide in an automatic scale of the class described a power actuated means for controlling the supply of material to be weighed.

It is a further object of the present invention to provide in an automatic scale of the class described a gate for cutting off the supply of material to be weighed and power-actuated means for controlling the operation of this gate.

It is a further object of the present invention to provide in an automatic scale of the class described a gate for cutting off the supply of material to be weighed which gate is constantly urged to a closed position and which is latched in an open position by a latching device releasable upon reaction of the scale beam through energy obtained from an external source of power.

Other and further objects of the present invention will become more apparent from a consideration of the following detailed description of a preferred but not necessarily the only form of the invention taken in connection with the drawings accompanying and forming a part of this specification.

In the drawings:

Fig. 2 is a front elevation of the same;

Fig. 3 is a section along the line 3—3 of Fig. 1; and

Figure 1:
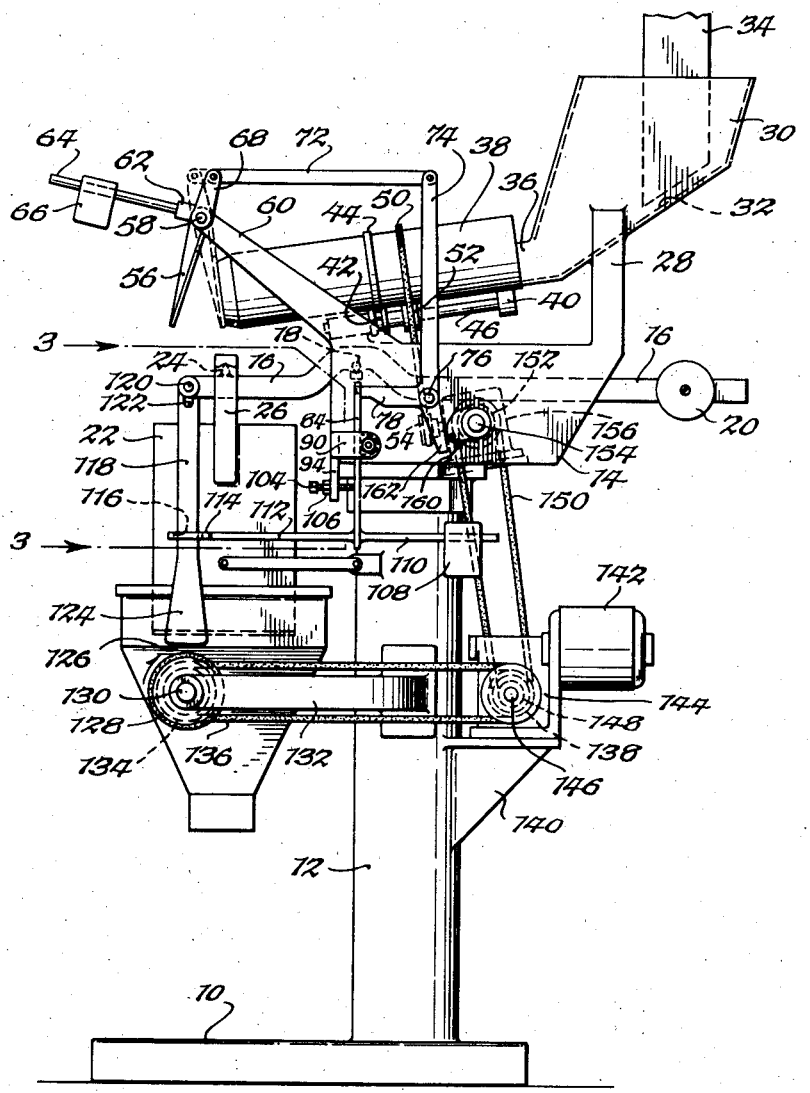
Fig. 1 is a side elevation of an automatic scale to which the present invention has been applied.

Similar characters of reference indicate similar parts throughout the several views. Referring now to the drawings, the automatic scale is shown as supported upon a base 10 and pedestal 12. At its upper end the pedestal 12 carries a bracket 14 upon which the various elements of the scale are supported. The weighing elements of the scale comprise a scale beam 16 supported on a knife edge and cup bearing 18 on the bracket 14.

At one end the scale beam carries a suitable adjustable weight 20 and at its other or forward end the scale beam supports a scale bucket 22 through the medium of a knife edge and cup bearing 24, one element of which is carried by the scale beam and the other element of which is carried by a bail 26 to which the bucket 22 is secured.

The bracket 14 serves also to support the material-supplying devices. An upward extension 28 of the bracket 14 carries a chute 30 having an inclined wall 32 and receiving the lower end of a down spout 34. The chute 30 is equipped with a discharge nozzle 36 which enters a rotary tube 38. The rotary tube is supported upon roller bearings 40 and 42 and it will be noted that the roller bearing 42 is grooved to receive annular guide ring 44 formed upon the exterior surface of the tube 38. This latter structure serves to hold the tube 38 in proper position upon the supporting rollers 40, 42. By referring to Fig. 2 it will be seen that the roller bearings are carried on shafts 46 and 48, respectively, extending generally parallel with the axis of the tube 38.

The tube 38 is held down upon its roller bearings 40, 42 and at the same time is driven by a belt 50 which extends upwardly and over the outer surface of the tube 38 and downwardly over guiding sheaves 52 carried on the shafts 46 and 48. The belt 50 also extends around a driving sheave 54 which is constantly rotated at a suitable speed by mechanism to be more fully described hereinafter.

The feeding structure just described has been set forth in full detail in said Patent No. 2,343,528 and reference is here made to said patent for details which have been omitted herein. This structure forms no specific part of the present invention but it is essential that some form of highly accurate material-supplying means be employed in order to obtain the full benefit of the present invention. The feeding mechanism just described serves to produce a uniform stream in the following manner: The material is introduced through the vertical down-spout 34 to the inclined wall 32 of the chute 30, and the flow of material from the lower end of the down-spout 34 may be quite accurately controlled by varying the distance between the lower end of the down-spout 34 and the inclined wall 32 in a manner more fully described in said patent. The material thereafter flows down the inclined wall 32 and into the rotating tube 38. The rotation of the tube 38 serves to "work" the stream of material into a body of extreme uniformity in cross-sectional dimensions and density. It will be noted that the tube 38 is inclined and it will be apparent that the stream of material will discharge from the left end of the tube as viewed in Fig. 1 under the action of gravity. The discharge end of the tube 38 is of course positioned in vertical alignment with the material receiving compartment of the scale bucket 22.

To cut off the stream of material discharging from the end of the tube 38 there is provided a gate 56 adapted to closely fit against the circular end of the tube 38 and pivoted at 58 on a bracket extension 60 of the main bracket 14. The gate 56 may be provided with a socket 62 into which is fitted a rod 64 extending generally at right angles to the plane of the gate proper. An adjustable weight 66 is positioned upon the rod 64 and adjustment thereof may be availed of to position it at such a distance from the pivot 58 as to urge the gate 56 to closed position illustrated in dotted lines in Fig. 1 with sufficient force to insure stopping of the stream of material.

Figure 4:
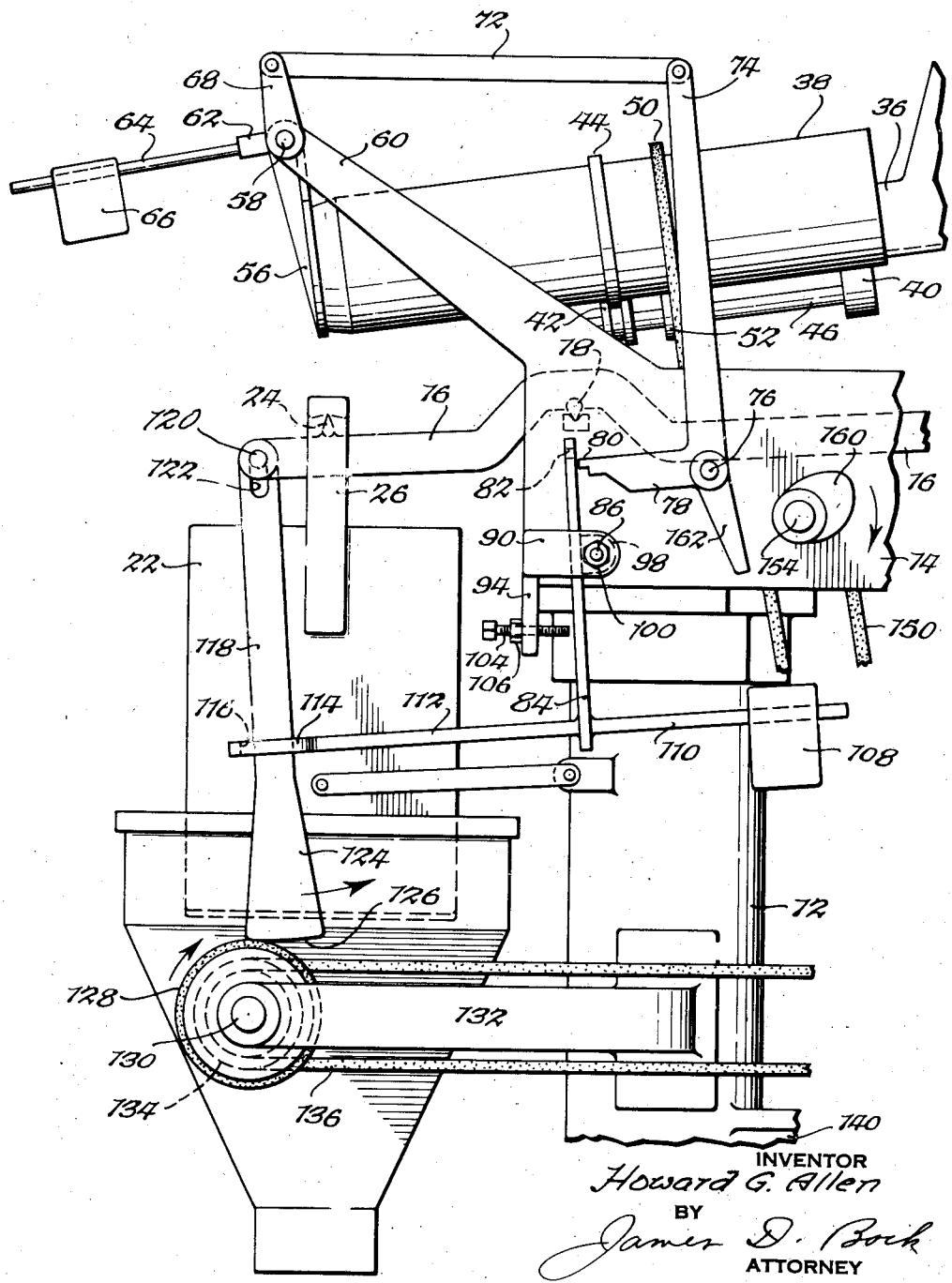
Fig. 4 is an enlarged view corresponding to Fig. 1 and showing the parts in an operated position.

Referring now to Fig. 2, it will be seen that the pivot 58 about which the gate operates comprises a cross-shaft freely pivoted in the two arms 60 extending upwardly from the bracket 14. At one end the shaft 58 has secured thereto a crank 68 having an elongated hub 70 affixed to the shaft 58 and serving to space the crank 68 from the other mechanism of the scale. A link 72 (Fig. 1) is freely pivoted to the free end of the crank 68 and extends rearwardly into pivotal connection with a substantially vertical arm 74 of a three-armed lever pivoted at 76 upon the bracket 14. A forwardly projecting arm 78 of this three-armed lever has formed on its outer end a latch nose 80 (see Figs. 3 and 4) which is adapted to enter an opening 82 in the upper end of a latch lever 84. The latch lever 84 is supported for pivotal movement between a pair of conical bearings 86, 88 threaded through two opposed arms 90, 92 of a bracket 94 secured to the main bracket 14 upon an extension 96 thereof. The latch lever 84 has a hub-like member 98 secured thereto for reception of the conical ends of the bearings 86, 88 and it will be understood that these bearings may be so adjusted as to insure free pivotal motion of the lever 84. The bearings are adapted to be locked in adjusted position by locknuts 100 and 102 associated respectively with the bearings 86 and 88.

The bracket 94 also includes a downward extension through which is threadably received a screw 104 adapted to be locked in position by a locknut 106. The inner end of the screw 104 may be so adjusted as to abut the lower portion of the latch lever 84 and prevent its rotation in a clockwise direction beyond a position in which the opening 82 therein is engaged with the latch nose 80 of the arm 78. The lever 84 is urged into this last named position by a weight 108 adjustably carried upon an arm 110 rigidly affixed to the lower end of the lever 84 and extending substantially at right angles thereto. A similar arm 112 is rigidly secured to the lever 84 and extends forwardly thereof to a position adjacent the scale bucket 22. At its forward end the arm 112 may be enlarged as at 114 and be provided with an opening 116 through which a latch-actuating lever or pallet 118 is freely received.

The pallet 118 is freely pivoted upon a suitable stud 120 carried on the extreme forward end of the scale beam 16. The pivotal connection includes an elongated slot 122 formed in the pallet 118 whereby relative vertical motion may occur between the pallet and the forward end of the scale beam. At its lower end the pallet 118 may be enlarged as at 124 and it may terminate in a convexly curved surface 126.

Directly beneath the convexly curved end of the pallet 118 there is provided a constantly rotating friction wheel 128 mounted upon a shaft 130 extending through a bracket 132 secured to the post 12. The wheel 128 is fixed for rotation with the shaft 130 and also fixed for rotation therewith is a sheave 134 about which is directed a belt 136. The belt 136 also extends around a driving sheave 138.

The post 12 carries upon a bracket 140 a motor 142 and speed reducer box 144. The details of the driving connection between motor 142 and the speed reducer 144 are omitted herein because this mechanism may assume any normal or desirable form. The speed reducer 144 may be of the variable speed type or provisions may be made for varying the speed of the motor 142. In either event the speed reducer serves to drive a shaft 146 at suitable selected speed of rotation and the driving sheave 138 is secured to the shaft 146 for rotation therewith.

The speed reducer 144 also drives a driving sheave 148 about which is conducted a belt 150 which extends upwardly and around a sheave 152 fixed for rotation with a shaft 154 extending generally cross-wise of the scale. One end of the shaft 154 enters a gear box 156 which contains suitable gearing of any desired form for imparting rotation to a shaft 158 upon which is fixed the driving sheave 54 previously mentioned as the means for driving the rotary feeding tube 38.

The other end of the shaft 154 extends outwardly of the bracket 14 and carries at its outer end a cam 160. The cam 160 is positioned in the path of the third arm 162 of the three-armed lever whose other members are 74 and 78. Preferably the cam 160 is formed with a single, relatively high-lift lobe in order that it may impart a substantial movement to the arm 162 within a short period of time in each complete rotation thereof.

The operation of the device will now be described.

A supply of the material to be weighed is introduced through the down-spout 34 to the chute 32 and feeding tube 38. The motor 142 is started and through the belts 150 and 50 the tube 38 is rotated about its longitudinal axis. The material will progress downwardly of the tube 38 and upon reaching the discharge end thereof it will drop into the bucket 22. As described in said patent No. 2,343,528, the stream of material thus dropping into the bucket 22 will be exceedingly uniform in cross-section and density for so long a time as the discharge thereof from the tube 38 is not interrupted by the gate 56. The motor 142 also serves through the belt 150 to rotate the cam 160 and through the belt 136 to rotate the friction wheel 128.

When a predetermined quantity of material has been accumulated in the bucket 22 the scale beam 16 will swing about its bearing 18 and the bucket 22 will move downwardly. Simultaneously the lever or pallet 118 will move downwardly and the lower surface 126 thereof will be brought into contact with the periphery of the friction wheel 128. As shown in Fig. 1 the friction wheel 128 rotates in a clockwise direction and frictional contact between this wheel and the surface 126 of the pallet will result in a counterclockwise rotation of the pallet about its pivot 120 at the end of the scale beam 16. As pointed out above, the opening 116 through which the pallet 118 extends in the arm 112 is somewhat larger than the cross-section of the pallet 118 to provide freedom from any frictional interference with lowering of the bucket in response to the weight of material therein. The counterclockwise movement of the pallet 118 will bring the right-hand edge of the pallet into contact with the right-hand margin of the opening 116 and thereafter the counterclockwise movement will be transmitted to the arm 112. Since the arm 112 is secured to the latch lever 84 for pivotal movement therewith about the bearings 86, 88, the upper end of the latch lever 84 will move to the left as viewed in Fig. 1 into the position illustrated in Fig. 4. During the course of this movement the opening 82 will be removed from its engagement with the latch nose 80 and the three-armed lever 78, 74, 162 will be free to swing about its pivot 76 under the impulse of the weight 66 associated with the gate. This latter movement will serve to close the gate 56 and cut off the stream of material.

Further downward movement of the bucket 22 will be freely permitted by the slot 122 in the upper end of the pallet 118. It will be recognized that the lost motion connection thus provided is essential to avoid an abrupt stopping of the downward motion of the bucket upon contact between the pallet 118 and the friction wheel 128. Such abrupt stopping of the bucket would tend to produce a reaction in the balance arm and this effect would be exaggerated by the frictional contact between the pallet and the friction wheel. The result of this unfavorable reaction would be for the bucket to be thrown upwardly before a sufficient period of time had elapsed for the pallet 118 to swing in a counterclockwise direction for operation of the latch-releasing mechanism. It may be further pointed out that since the pallet 118 hangs freely from the end of the balance arm, the weight thereof will be subtracted from the total weight of the forward end of the balance arm and the bucket and the charge of material therein and, as a result of this situation, the bucket 22 will tend to cease its downward movement in a very gentle and desirable manner.

It will be appreciated that the motions of the pallet and of the latch release lever 84 are positively imparted by the power driven friction wheel 128 and, accordingly, the time required for such motions will be uniform in each operation thereof so long as the friction wheel 128 rotates at a steady rate of speed. It will be further appreciated that the weight 66 upon the gate 56 may be of sufficient size as to positively and firmly close the gate in a period of time exactly equal in each operation thereof. Accordingly, these two accurately controlled periods of time will represent in each operation of the scale the total period of time elapsing between dropping of the bucket to such position as to bring the pallet and friction wheel 128 into contact and closing of the gate 56. Obviously this total period of time will be provided for in the initial balancing of the scale beam. Provision will also be made for the stream of material in the air at the instant of gate closure. If a uniform stream is supplied to the scale the stream in the air will be uniform at each operation and, accordingly, the final charge of material accumulated within the bucket 22 will be exceedingly uniform upon each operation of the scale.

The lightening of the bucket resulting from the lost motion connection between the pallet 118 and the scale beam 16 tends to overcome a characteristic of a scale which serves to slow its operation. This characteristic is that of a delay in the commencement of upward motion of the bucket after the load has been discharged therefrom. There is a noticeable lag and, of course, this lag results in loss of time. In the present structure the relatively slight reduction in total weight assists in shortening the period of time thus lost because the scale beam loses some of its tendency to swing downwardly on the bucket end and accordingly is more nearly ready to swing in the opposite direction when the load is discharged.

The mechanism just described is reset for operation by the cam 160. This cam is driven through the belt 150 and the speed of rotation thereof is so chosen as to pace the scale in its operation. Contact of the cam 160 with the arm 162 of the three-armed lever through which the gate is actuated will result in a clockwise rotation of the three-armed lever which is imparted through the link 72 to the gate 56. The clockwise motion of the gate moves it from its dotted line or closed position in Fig. 1 to its full line or open position in said figure. The clockwise motion of the three-armed lever also brings the latch nose 80 into a position opposite the opening 82 in the latch lever 84. Under the impulse of the weight 108 the opening 82 will be brought over the latch nose 80 and the gate 56 will thereafter be latched in its open position until the next downward movement of the bucket 22 occurs.

Mention was made above of the pacing of the scale by the cam 150. It will be appreciated that with a uniform stream of material and the uniformly timed, gate-closing mechanism herein described the scale will tend to operate in almost exactly the same amount of time for each cycle. Some minor variations may occur in this respect, and accordingly the cam 160 must be driven at such a speed that it will open the gate 56 after the bucket 22 is completely emptied and the discharge gates thereof (not shown) have been closed. As a matter of practice, the cam 160 will be set to revolve at a rate just slightly slower than the rate at which the scale would tend to operate if it were not paced. Thus opening of the gate by the cam 160 initiates a new cycle of operation independently timed upon each revolution of the cam. Observation of the characteristics of the particular scale involved will lead the operator to the selection of exactly the proper speed of rotation of the cam 160 to obtain a maximum production rate consistent with complete reliability in operation and accuracy of the charges delivered.

From the above detailed description it will be apparent that there is provided an embodiment of this invention which achieves the objects thereof. Modifications and variations may be resorted to by those skilled in the art and portions of the improvement may be used without others. Accordingly, the above description is to be taken in an illustrative rather than in a limiting sense and all such modifications and variations as are within the scope of the appended claims are intended to be covered thereby.

I claim:

1. In an automatic weighing device, the combination of a main frame; means for supplying a stream of material to be weighed; a balancing beam mechanism including a weighing bucket movable downwardly upon the positioning in said bucket of a predetermined quantity of material; a gate associated with said supplying means and movable from an opened position in which said stream of material is permitted to flow to said weighing bucket to a closed position wherein said stream of material is cut off; means for moving said gate to opened position; means constantly urging said gate toward closed position; and latch means for holding said gate in opened position; latch release means comprising, a wheel rotatable about an axis fixed with respect to said main frame and relative to which said balancing beam mechanism is movable, means for rotating said wheel, a lever freely depending from said balancing beam mechanism and movable downwardly with said bucket into direct frictional engagement with said wheel, said frictional engagement transmitting motion of said wheel to said lever to produce pivotal movement thereof relative to said balancing beam mechanism, and means carried by said main frame for transmitting the pivotal motion of said lever to said latch means to release the same and thereby to close said gate.

2. In an automatic weighing device, the combination of a main frame; means for supplying a stream of material to be weighed; a balancing beam mechanism including a weighing bucket movable downwardly upon the positioning in said bucket of a predetermined quantity of material; a gate associated with said supplying means and movable from an opened position in which said stream of material is permitted to flow to said weighing bucket to a closed position wherein said stream of material is cut off; means for moving said gate to opened position; means constantly urging said gate toward closed position; latch means for holding said gate in opened position; and latch release means comprising, a wheel rotatable about an axis fixed with respect to said main frame and relative to which said balancing beam mechanism is movable, means for rotating said wheel, a lever freely depending from said balancing beam mechanism and movable downwardly with said bucket into direct frictional engagement with said wheel, said frictional engagement transmitting motion of said wheel to said lever to produce pivotal movement thereof relative to said balancing beam mechanism, a second lever pivoted on said main frame and extending into proximity with said first named lever, and an abutment on said second lever positioned in the path of pivotal movement of said first-named lever for transmitting the pivotal movement of said first-named lever to said second lever, said second lever being connected with said latch means whereby upon pivotal movement of said first-named lever said latch means will be released to initiate closing of said gate.

3. In an automatic weighing device, the combination of means for supplying a stream of material to be weighed; a balancing beam mechanism including a weighing bucket movable downwardly upon the positioning in said bucket of a predetermined quantity of material; a gate associated with said supplying means and movable from an opened position in which said stream of material is permitted to flow to said weighing bucket to a closed position wherein said stream of material is cut off; means for moving said gate to opened position; a wheel rotatable about an axis relative to which said balancing beam mechanism is movable; means for rotating said wheel; a lever carried by said balancing beam mechanism and mounted for pivotal movement about an axis movable with said balancing beam mechanism, said lever being so positioned with respect to said wheel that upon downward movement of said bucket a surface of said lever is brought into frictional engagement with said wheel and further downward movement of said lever with said balancing beam mechanism is prevented, said frictional engagement being effective to transmit motion of said wheel to said lever to cause movement of said lever about its axis; means positioned to be engaged by said lever and responsive to movement of said lever about its axis for closing said gate; the said mounting of the lever upon the balancing beam comprising a lost motion connection between said lever and said balancing beam mechanism so constructed and arranged as to permit continued movement of said balancing beam mechanism relative to said lever upon contact of said lever with said wheel.

4. In an automatic weighing device, the combination of means for supplying a stream of material to be weighed; a balancing beam mechanism including a weighing bucket movable downwardly upon the positioning in said bucket of a predetermined quantity of material; a gate associated with said supplying means and movable from an opened position in which said stream of material is permitted to flow to said weighing bucket to a closed position wherein said stream of material is cut off; means for moving said gate to opened position; a wheel rotatable about an axis relative to which said balancing beam mechanism is movable; means for rotating said wheel; a lever carried by said balancing beam mechanism and mounted for pivotal movement about an axis movable with said balancing beam mechanism, said lever being so positioned with respect to said wheel that upon downward movement of said bucket a surface of said lever is brought into frictional engagement with said wheel and further downward movement of said lever with said balancing beam mechanism is prevented, said frictional engagement being effective to transmit motion of said wheel to said lever to cause movement of said lever about its axis; means positioned to be engaged by said lever and responsive to movement of said lever about its axis for closing said gate; said mounting of the lever upon the balancing beam comprising a pin and slot connection to permit continued movement of said balancing beam mechanism upon engagement of said lever with said wheel.

HOWARD G. ALLEN.